US008746552B1

(12) United States Patent
Yokomoto et al.

(10) Patent No.: US 8,746,552 B1
(45) Date of Patent: Jun. 10, 2014

(54) CARD READER ACTIVITY SYSTEMS AND METHODS

(71) Applicant: Citigroup Technology, Inc., Weehawken, NJ (US)

(72) Inventors: Randal Yokomoto, Torrance, CA (US); Ian Kidman, Newbury Park, CA (US)

(73) Assignee: Citigroup Technology, Inc., Weehawken, NJ (US)

( * ) Notice: Subject to any disclaimer, the term of this patent is extended or adjusted under 35 U.S.C. 154(b) by 0 days.

(21) Appl. No.: 14/163,144

(22) Filed: Jan. 24, 2014

(51) Int. Cl.
*G06F 17/00* (2006.01)
*G06F 19/00* (2011.01)
*G06Q 40/00* (2012.01)

(52) U.S. Cl.
USPC .............. 235/379; 235/375; 235/435; 705/43

(58) Field of Classification Search
CPC ........... G07F 19/00; G07F 19/20; G07F 7/00; G07F 17/30; G07F 19/207
USPC ............ 235/375, 379, 435, 449, 451; 705/43; 902/8–9
See application file for complete search history.

(56) References Cited

U.S. PATENT DOCUMENTS 4,237,799 A * 12/1980 Berman ............................ 109/2
6,298,603 B1 10/2001 Diaz
6,508,398 B1 1/2003 Estes
7,075,429 B2 7/2006 Marshall
7,641,107 B1 1/2010 Gill et al.
7,810,734 B2 10/2010 Rakoff et al.
8,474,704 B1 7/2013 Grimm et al.

(Continued)

FOREIGN PATENT DOCUMENTS

GB 2446425 A 8/2008
WO WO 2013/149310 10/2013

OTHER PUBLICATIONS

Albanese et al., "Fast Activity Detection: Indexing for Temporal Stochastic Automation-Based Activity Models", IEEE Transactions on Knowledge and Data Engineering, vol. 25, Issue 2, Feb. 2013, pp. 360-373.

(Continued)

*Primary Examiner* — Michael G Lee
*Assistant Examiner* — Laura Gudorf
(74) *Attorney, Agent, or Firm* — John M. Harrington, Esq.; Johnson, Marcou & Isaacs, LLC

(57) ABSTRACT

Methods, systems, and machines for monitoring card reader activity involve, for example, receiving data regarding a level of activity of a card reader of an access door of a self-service financial transaction terminal vestibule and also receiving data regarding a level of activity of a card reader of at least one self-service financial transaction terminal located within the vestibule. Periodically, the level of activity of the card reader of the access door may be compared with the level of activity of the card reader of the at least one self-service financial transaction terminal, and an alert may be generated when a ratio of the level of activity of the card reader of the access door to the level of activity of the card reader of the at least one self-service financial transaction terminal falls below a predetermined value.

17 Claims, 7 Drawing Sheets

(56) References Cited

U.S. PATENT DOCUMENTS

| | | | |
|---|---|---|---|
| 2005/0270149 | A1 | 12/2005 | Standing |
| 2008/0074496 | A1 | 3/2008 | Venetianer et al. |
| 2009/0267764 | A1 | 10/2009 | Klaas et al. |
| 2013/0024300 | A1 | 1/2013 | Choudhuri et al. |
| 2013/0264386 | A1 | 10/2013 | Greenspan |
| 2013/0265136 | A1 | 10/2013 | Wadia |
| 2013/0299585 | A1 | 11/2013 | Yokomoto et al. |

OTHER PUBLICATIONS

Tarman et al., “Asynchronous Transfer Mode (ATM) Intrusion Detection”, Military Communications Conference, Milcom 2001, Communications for Network-Centric Operations: Creating the Information Force, IEEE, vol. 1, 2001, pp. 87-91.

IP.Com et al., “Alert PIN for Personal Banking Terminals”, IP.Com Prior Art Database Technical Disclosure, IPCOM000104652D, Mar. 19, 2005, pp. 1-5.

* cited by examiner

| | PARAMETER | VALUE |
|---|---|---|
| 400 | Door_Popper_Monitoring_Enable | On |
| 402 | Alert_Condition_ATM_Sessions | 10 |
| 404 | Alert_Condition_Time | 1Hour |
| 406 | Alert_Condition_Entry_Percentage | 50% |

Fig. 4

500

| | |
|---|---|
| CODE/MESSAGE TEXT: | DOOR POPPER-SECURITY ALERT: VESTIBULE DOOR IS DISABLED |
| COLOR: | YELLOW |
| ERROR DESCRIPTION: | THE VESTIBULE DOOR IS DISABLED. |
| CAT SCREEN CONTENTS: | NO IMPACT. |
| CUSTOMER IMPACT: | NONE: |
| FINANCIAL IMPACT: | $__ |
| RESOLUTION: | NONE: |

Fig. 5A

502

| | |
|---|---|
| CODE/MESSAGE TEXT: | DOOR POPPER-SECURITY ALERT: VESTIBULE DOOR IS ENABLED |
| COLOR: | GREEN |
| ERROR DESCRIPTION: | THE VESTIBULE DOOR IS ENABLED. |
| CAT SCREEN CONTENTS: | NO IMPACT. |
| CUSTOMER IMPACT: | NONE: |
| FINANCIAL IMPACT: | $__ |
| RESOLUTION: | NONE: |

Fig. 5B

504

| | |
|---|---|
| CODE/MESSAGE TEXT: | DOOR POPPER-SECURITY ALERT: DOOR POPPER ACTIVITY - OK |
| COLOR: | GREEN |
| ERROR DESCRIPTION: | THE DOOR POPPER MONITOR ALERTS ARE TURNED ON, VESTIBULE DOOR IS ENABLED, AND ACTIVITY IS OK, OR DOOR POPPER MONITORING IS TURNED OFF. |
| CAT SCREEN CONTENTS: | NO IMPACT. |
| CUSTOMER IMPACT: | NONE: |
| FINANCIAL IMPACT: | $__ |
| RESOLUTION: | NONE: |

Fig. 5C

506

| | |
|---|---|
| CODE/MESSAGE TEXT: | DOOR POPPER-SECURITY ALERT: DOOR POPPER ACTIVITY - NOT OK |
| COLOR: | RED |
| ERROR DESCRIPTION: | THE DOOR POPPER MONITOR ALERTS ARE TURNED ON, VESTIBULE DOOR IS ENABLED, AND ACTIVITY IS NOT OK. |
| CAT SCREEN CONTENTS: | NO IMPACT. |
| CUSTOMER IMPACT: | NONE: |
| FINANCIAL IMPACT: | $__ |
| RESOLUTION: | THIS MAY REQUIRE A SITE VISIT TO INSPECT FOR PROPER DOOR POPPER OPERATION, AND A POSSIBLE FRAUDULENT DEVICE. |

Fig. 5D

CARD READER ACTIVITY SYSTEMS AND METHODS

FIELD OF THE INVENTION

The present invention relates generally to the field of magnetic stripe cards and more particularly to card reader activity monitoring systems and methods.

BACKGROUND

The magnetic stripe of a magnetic stripe bankcard may be read by a magnetic read head of a card reader, for example, of an automated teller machine (ATM) to enable the cardholder to perform an ATM transaction. As is generally known, an ATM is a type of self-service financial transaction terminal that may also be referred to, for example, as an automated banking machine or a cash machine, as well as by various trade names. The card reader captures the cardholder's account and related information recorded on the magnetic stripe, which may be sent to a host processor coupled to the ATM. The host processor may use such information to route the transaction to the cardholder's bank. An ATM keypad may let the cardholder enter a personal identification number (PIN) and information about the transaction which the cardholder wishes to perform.

In addition, magnetic stripe card readers may be deployed to control access to areas, such as ATM lobbies or vestibules, that are provided with doors secured, for example, by electric, electronic, or electromechanical locks. Such door locks may be unlocked, for example, by inserting or swiping a properly encoded magnetic stripe card at a card reader. If the proper credentials are encoded on the magnetic stripe, a signal may be sent to the door lock to unlock the door and admit the cardholder. Such deployments are referred to herein as "door poppers".

In recent years, huge economic losses have been incurred as a result of the theft and fraudulent use by criminals of cardholders' credentials recorded on the magnetic stripe of their bankcards. One way in which such theft occurs is a criminal practice referred to as "skimming" of bankcard information when a magnetic stripe bankcard is used by a cardholder, for example, in an otherwise legitimate transaction at an ATM or for access at a door popper of an ATM vestibule or lobby.

A typical skimming operations may involve criminals placing a device, such as an overlay with a skimming read head, over a card slot of an ATM or door popper which reads the magnetic stripe as the cardholder unknowingly passes his or her bankcard through the card slot to be read by the internal read head of the ATM or door popper. The skimming read head reads the same bankcard information that is read by the ATM or door popper read head and records or sends the information to the criminals.

Skimming overlays may also include a keypad overlay that matches up with buttons on the legitimate keypad beneath the overlay and records and sends the cardholders' PINs to the criminals. Regardless of the skimming technique used, it is important to criminal skimmers to make sure that the device at which their skimming activity occurs, such as an ATM or door popper, continues to work normally so that cardholders are unaware that their bankcard information is being illegally recorded.

In the past, various anti-skimming solutions have been deployed on ATMs and door poppers across the U.S. One such solution described in U.S. Pat. No. 8,622,296 entitled "Magnetic Stripe Card Reader Assembly and Method" has been introduced to protect ATM and door popper card readers with a design that is inherently resistant to skimming. Such a card reader assembly is configured to receive a bankcard in the card opening with its long edge first and the magnetic stripe of the bankcard perpendicular to the path of the bankcard as it is received so that it is impossible for an external skimming read head to read the magnetic stripe of the bankcard.

The solution described in U.S. Pat. No. 8,622,296 has done an effective job of preventing skimming at ATMs and door poppers. The particular solution represents a positive step in eliminating door popper fraud or skimming. However, once criminals realize the difficulty of skimming at a door popper on which the solution is deployed, they may seek to disable the door popper itself so that the door to an ATM vestibule remains unlocked. Such criminals may then substitute their own card reader to read and capture cardholders' magnetic stripe card data. In addition, such criminals may mount hidden or disguised miniature cameras on the ATMs in the ATM vestibule or lobby to capture the cardholders' PIN information as the cardholders use the ATMs.

There is a present need for systems and methods for monitoring door popper card reader activity that avoid exposing a cardholder's account information to potential theft by skimmers when the cardholder uses his or her magnetic stripe card at a door popper to access a locked premises, such as a bank branch or an ATM vestibule or lobby to perform an ATM transaction.

SUMMARY OF THE INVENTION

Embodiments of the invention may employ computer hardware and software, including, without limitation, one or more processors coupled to memory and non-transitory computer-readable storage media with one or more executable programs stored thereon which instruct the processors to perform the card reader activity monitoring described herein. Embodiments of the invention provide methods, systems, and machines for monitoring card reader activity that may involve, for example, receiving, using a processor coupled to memory, data regarding a level of activity of a card reader of an access door of a self-service financial transaction terminal vestibule; receiving, using the processor, data regarding a level of activity of a card reader of at least one self-service financial transaction terminal located within the self-service financial transaction terminal vestibule; comparing, using the processor, the level of activity of the card reader of the access door with the level of activity of the card reader of the at least one self-service financial transaction terminal; and generating, using the processor, an alert when a ratio of the level of activity of the card reader of the access door to the level of activity of the card reader of the at least one self-service financial transaction terminal falls below a predetermined value.

In aspects of embodiments of the invention, receiving the data regarding the level of activity of the card reader of the access door may involve, for example, receiving the data regarding the level of activity of the card reader of the access door by a processor of a door popper activity monitor. In other aspects, receiving the data regarding the level of activity of the card reader of the access door may involve, for example, receiving the data regarding the level of activity of the card reader of the access door by the processor of the door popper activity monitor from a processor of a door popper server. In further aspects, receiving the data regarding the level of activity of the card reader of the access door may involve, for example, receiving a notification message by the processor of the door popper activity monitor from the processor of the door popper server each time the processor of the door popper server sends an open door reply message to a processor of a door popper controller coupled to the card reader of the access door.

In further aspects of embodiments of the invention, receiving the data regarding the level of activity of the card reader of the at least one self-service financial transaction terminal may involve, for example, receiving the data regarding the level of activity of the card reader of the at least one self-service financial transaction terminal by a processor of a door popper activity monitor. In additional aspects, receiving the data regarding the level of activity of the card reader of the at least one self-service financial transaction terminal may involve, for example, receiving the data regarding the level of activity of the card reader of the at least one self-service financial transaction terminal by the processor of the door popper activity monitor from a self-service financial transaction terminal server. In still other aspects, receiving the data regarding the level of activity of the card reader of the at least one self-service financial transaction terminal may involve, for example, receiving a notification message by the processor of the door popper activity monitor from the processor of the self-service financial transaction terminal server each time the processor of the self-service financial transaction terminal server sends an authorization reply message to a processor of the at least one self-service financial transaction terminal.

In additional aspects of embodiments of the invention, comparing the level of activity of the card reader of the access door with the level of activity of the card reader of the at least one self-service financial transaction terminal may involve, for example, calculating the ratio of the level of activity of the card reader of the access door to the level of activity of the card reader of the at least one self-service financial transaction terminal. In other aspects, calculating the ratio may involve, for example, calculating the ratio of the level of activity of the card reader of the access door to the level of activity of the card reader of the at least one self-service financial transaction terminal based on data regarding the predetermined level of activity of the card reader of the access door and data regarding the predetermined level of activity of the card reader of the at least one self-service financial transaction terminal received during a predetermined period of time. In further aspects, calculating the ratio may involve, for example, calculating the ratio of the level of activity of the card reader of the access door to the level of activity of the card reader of the at least one self-service financial transaction terminal based on data regarding the predetermined level of activity of the card reader of the access door and data regarding the predetermined level of activity of the card reader of the at least one self-service financial transaction terminal received during a predetermined period of time when a locking mechanism of the access door is enabled.

In other aspects of embodiments of the invention, generating the alert may involve, for example, generating the alert by a processor of a door popper activity monitor. In further aspects, generating the alert may involve, for example, remotely disabling the at least one self-service financial transaction terminal when the ratio of the level of activity of the card reader of the access door to the level of activity of the card reader of the at least one self-service financial transaction terminal falls below the predetermined value. In still further aspects, generating the alert may involve, for example, generating the alert when the ratio of the level of activity of the card reader of the access door to the level of activity of the card reader of the at least one self-service financial transaction terminal falls below a predetermined adjustable value. In additional aspects, generating the alert may involve, for example, adjusting the predetermined adjustable value when a predetermined level of false alerts are generated. In still other aspects, adjusting the predetermined adjustable value may involve, for example, decreasing the predetermined adjustable value when the predetermined level of false alerts are generated.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 4 is a table that illustrates examples of configurable parameters for embodiments of the invention;

FIGS. 5A, 5B, 5C, and 5D show examples of error codes that may be displayed on the door popper status display for embodiments of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention involve, for example, monitoring and comparing the activity of an ATM lobby or vestibule door popper with a number of ATM sessions performed at ATMs located within the particular ATM lobby as an indicator of proper or improper functioning of the ATM vestibule access system and generating reports of such monitoring activities.

Figure 1:
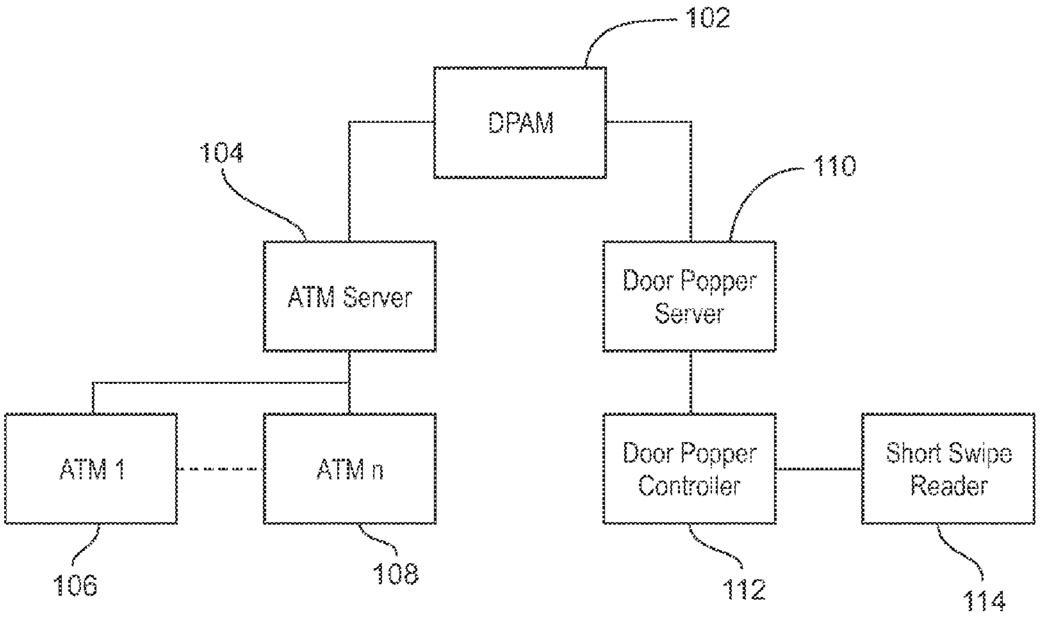
FIG. 1 is a schematic diagram that illustrates an example overview of components and the flow of information between components for embodiments of the invention.

FIG. 1 is a schematic diagram that illustrates an example overview of components and the flow of information between components for embodiments of the invention. Referring to FIG. 1, a processor of a door popper activity monitor 102 may be coupled to a processor of an ATM server 104 which, in turn, may be coupled to processors of a plurality of ATMs 106, 108, each of which ATMs is equipped with a card reader (not separately illustrated). It is to be understood that while the example of FIG. 1 includes two ATMSs 106, 108 located within a single ATM lobby, embodiments of the invention may separately monitor any number of ATMs located within any number of ATM lobbies.

Referring further to FIG. 1, the processor of the door popper activity monitor 102 may also be coupled to a processor of a door popper server 110 which may, in turn, be coupled to a processor of a door popper controller 112. In addition, the processor of the door popper controller 112 may be coupled to a card reader 114 of a lockable ATM vestibule door.

According to embodiments of the invention, the door popper activity monitor 102 may monitor both the door popper of an access door of an ATM lobby or vestibule and ATM traffic at ATMs 106, 108 located within the ATM vestibule or lobby. At predetermined intervals of time, the door popper activity monitor 102 may compare the monitored door popper activity with the monitored ATM traffic within the ATM lobby or vestibule and issue a warning if the ratio of one to the other falls outside a predetermined range.

It is to be understood that for an ATM lobby or vestibule at a bank branch, the door popper may be intentionally disabled so that the vestibule door is left unlocked during normal branch business hours. Thus, during normal business hours, no door popper activity may be expected while ATM traffic may occur as usual. Therefore, there is no need for door popper activity alerts, and the alert functionality of the door popper activity monitor 102 may be turned off by the bank.

On the other hand, after normal branch business hours, access to the ATM lobby or vestibule at the branch may be controlled by the door popper, and the door popper activity monitor 102 may therefore be turned on by the bank. During such times when access to the ATM lobby or vestibule at the branch is controlled by the door popper, both door popper activity and ATM transactions are expected.

In theory, there should always be some amount of door popper activity during such times when ATM sessions are occurring within the ATM lobby or vestibule and the vestibule door lock is operating properly. It is expected, however, that during those times, the door popper activity may be lower than the ATM activity because, for example, some customers may perform multiple ATM sessions and other customers may enter the ATM vestibule door by "tailgating" a customer who holds the door open.

In embodiments of the invention, a ratio of the door popper activity to the ATM activity within a particular ATM lobby or vestibule may be calculated periodically, such as hourly, by the door popper activity monitor 102. If the calculated ratio falls below a predetermined configurable number a door popper activity monitor alert may be generated. Such an alert may be caused, for example, by a skimmer disabling the ATM vestibule door lock and replacing or overlaying the door popper card reader 114 with a skimming card reader. Another cause for such an alert may be that the ATM vestibule door is simply jammed open so that customers may be entering the ATM vestibule without using the door popper reader 114. In either case, a technician may visit the site of the particular ATM vestibule to determine the cause of the alert.

Referring further to FIG. 1, in embodiments of the invention, processors of one or more of the ATMs 106, 108 in the ATM vestibule may send reports of "good" ATM card dips or swipes to a processor of the ATM server 104. The processor of the ATM server 104 may, in turn, send messages reporting ATM traffic to the processor of the door popper activity monitor 102.

Referring also to FIG. 1, the processor of the door popper server 110 may send messages reporting door popper activity to the processor of the door popper activity monitor server 102. For example, the processor of the door popper server 110 may process bank identification number ("BIN") inquiry messages received from the processor of the door popper controller 112 and send "open door" reply messages to such inquiries when the BIN number is verified. It is to be understood, the door popper server 110 may process BIN inquiry messages from, and send reply messages to, the processors of the multiple door popper controllers for multiple ATM vestibules.

In embodiments of the invention, when the response to a BIN inquiry message contains the "open door" reply to a particular door popper controller 112, the processor of the door popper server 110 may also send a message to the processor of the door popper activity monitor 102 containing an identification of the particular door popper controller 112. The receipt of such messages may enable the processor of the door popper activity monitor 102 to determine the traffic at ATM vestibule door poppers for any number of ATM vestibules. In addition, status messages may be received by the processor of the door popper activity monitor 102 to indicate if a particular ATM vestibule door lock has been turned off by bank personnel. Such status messages may be included, for example, with the message containing the identification of the particular door popper controller.

In embodiments of the invention, the processor of the door popper controller 112 may send the messages to the processor of the door popper activity monitor 102 to report if the ATM vestibule door has been disabled by bank personnel. To accomplish this, an input to the processor of the door popper controller 112 may monitor a state of a switch used, for example, by bank personnel to disable the vestibule door. Thus, messaging from processor of the door popper controller 112 to the processor of the door popper server 110 may, in turn, include a status of the vestibule door as "disabled", for example, by bank personnel.

Referring once more to FIG. 1, in embodiments of the invention, the processor of the door popper controller 112 may receive data from the door popper card reader 114 and send the card BIN inquiry and card reader status to the processor of the door popper server 110. The processor of the door popper controller 112 may allow ATM vestibule door access and control an indicator feedback to a customer on a customer interface panel. As previously noted, the door popper server 110 may monitor door popper controllers at multiple ATM vestibule locations and may pass BIN query requests from the door popper controllers at various ATM vestibule sites to a transaction processing system of the bank. The door popper server 110 may also monitor such various door popper controllers for status and may send door popper activity information to the door popper activity monitor processor 102. As noted, any number of ATMs may be located within each ATM lobby or vestibule that is served by a particular ATM door popper.

In embodiments of the invention, the processor of the door popper activity monitor 102 may track and count ATM activity. Such door popper activity may be enabled when both the ATM vestibule door and door popper monitoring are enabled. In a door popper-to-ATM association aspect, each door popper may have a list of ATMs that are accessed using the particular door popper.

In embodiments of the invention, the total ATM activity of all ATMs served by a particular ATM vestibule door popper or located within the ATM vestibule may be tracked, and the total number of ATM sessions started or good card reads may be counted. Total numbers of ATM sessions for each hour of a current day and/or a current day and past day may be maintained. If a particular ATM or ATM vestibule is served by more than one door popper, the ATM activity may register for all door poppers that allow access to the particular ATM or ATM vestibule. The door popper activity may be tracked for each ATM lobby door popper, for example, by counting door popper "open door" responses to BIN query messages and maintaining a count of door popper "open door" responses for each predetermined period, such as each hour, of a current day and/or a current day and past day.

In embodiments of the invention, alert monitoring may show when door popper alert monitoring should be active, such as when an ATM vestibule door and door popper monitoring are both enabled. When an ATM vestibule door is disabled by bank personnel the particular door is free to open without requiring the use of a card reader. Typically ATM vestibule doors may be disabled by branch personnel using, for example, a key switch during normal branch business hours. When the ATM vestibule door is enabled, the door is under control of the door popper controller 112, and the card reader 114 must be used to open the door. Branch personnel may typically enable the ATM vestibule door lock when the branch is closed Embodiments of the invention may include predefined alert condition parameters that include, for example, rules to generate an alert. Such predefined alert condition parameters may include, for example, a minimum period of time before reporting an alert, a minimum ATM sessions count, and a minimum ratio of door open responses to ATM sessions. In embodiments of the invention, a single set of predefined alert condition parameters may be used by all ATM vestibule door poppers of an entity. It is to be noted that the foregoing predefined alert condition parameters are examples only and embodiments of the invention may include any suitable alert condition parameters.

Figure 2:
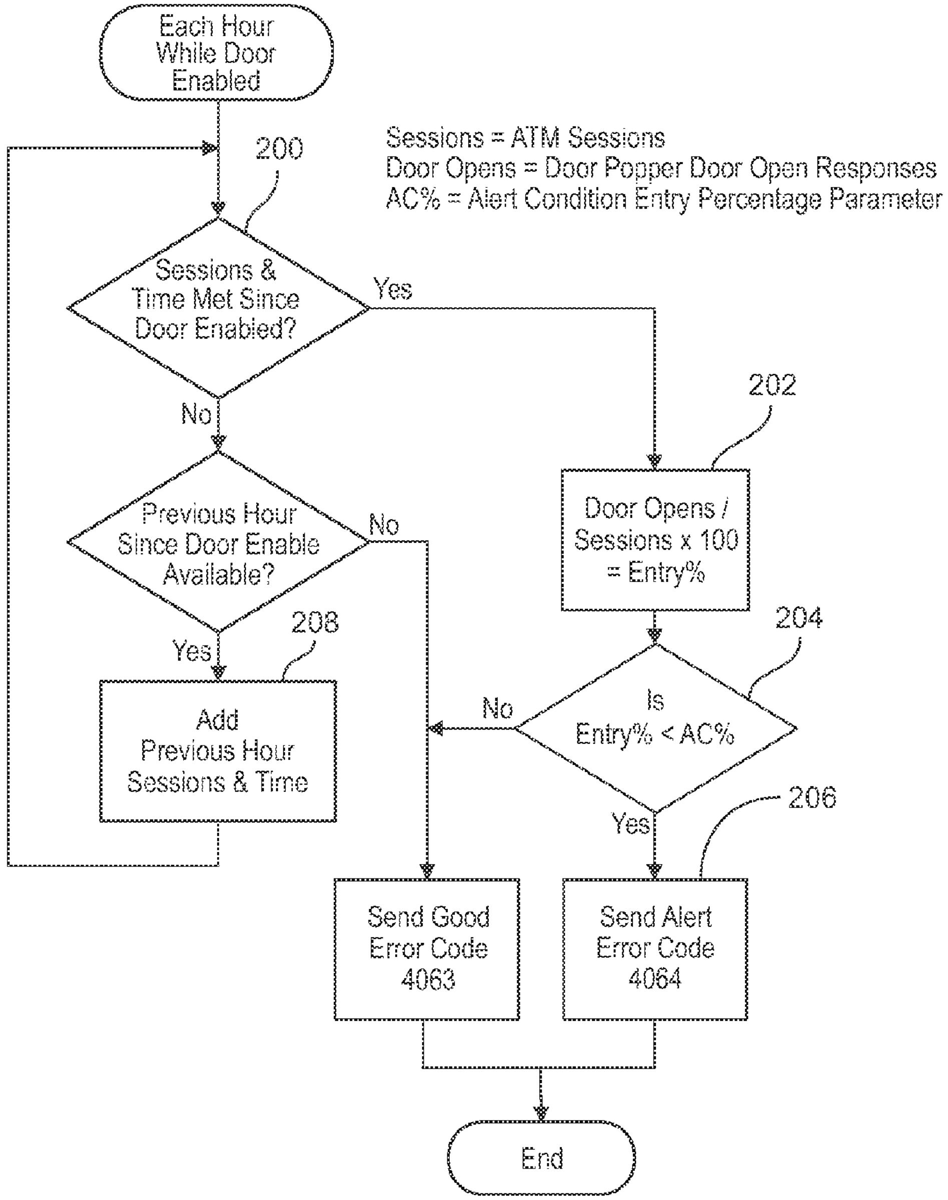
FIG. 2 is a schematic flow diagram that illustrates an example of the process of determining when to generate an alert for embodiments of the invention.

As noted, embodiments of the invention may employ one or more algorithms, an example of which may be an alert algorithm for determining when to send an alarm. FIG. 2 is a schematic flow diagram that illustrates an example of the process of determining when to generate an alert for embodiments of the invention. For example, at 200, if a current number of ATM sessions or a current period of time is sufficient to meet the predetermined parameters, the determination may be made to generate an alert. At 202, a number of ATM lobby "open door" responses relative to a total number of ATM sessions within the particular ATM lobby may be evaluated at an end of each predetermined period, such as an hour. If, at 204, the value of the ratio is less than a predetermined number, an error code may be sent at 206.

Referring further to FIG. 2, at 200, if the current number of ATM sessions or the current period of time is insufficient to meet the predetermined parameters, in order to avoid generating a false alert because of insufficient data, at 208, the number of ATM vestibule "open door" responses and the total number of ATM sessions during a preceding period of time, such as a preceding hour, during which the vestibule door lock was not disabled by bank personnel, may be added to the calculation of the ratio.

Figure 3:
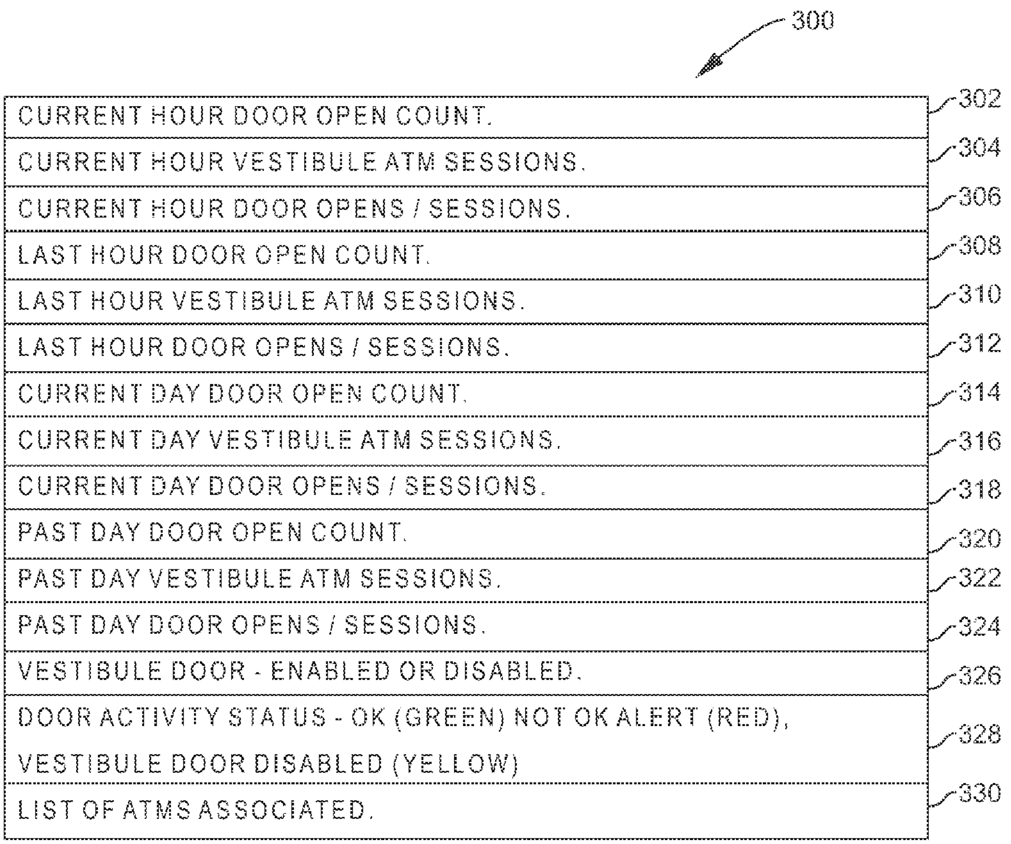
FIG. 3 is a table that illustrates examples of items that may be displayed on the door popper status display for embodiments of the invention.

In embodiments of the invention, the ATM server 104 shown in FIG. 1 may include, for example a door popper status display that may be activated by selection of a door popper status tab. FIG. 3 is a table 300 that illustrates examples of items that may be displayed on the door popper status display for embodiments of the invention. Referring to FIG. 3, such items may include, for example, current period (e.g., hour) door open count 302; current period (e.g., hour) vestibule ATM sessions 304; current period (e.g., hour) door opens/sessions 306; last period (e.g., hour) door open count 308; last period (e.g., hour) vestibule ATM sessions 310; and last period (e.g., hour) door opens/sessions 312; current day door open count 314. Referring further to FIG. 3, such items may also include, for example, current day vestibule ATM sessions 316; current day door opens/sessions 318; past day door open count 320; past day vestibule ATM sessions 322; last day door opens/sessions 324; vestibule door—enabled or disabled 326; door activity status—okay (green), not okay alert (red), vestibule door disabled (yellow) 328; and list of ATMs associated 330.

FIG. 4 is a table that illustrates examples of configurable parameters for embodiments of the invention. Such configurable parameters may be set, for example, by each business of an entity at the business's discretion. Referring to FIG. 4, configurable parameters that may be changed by a business may include, for example, Door_Popper_Monitoring_Enable 400; Alert_Condition_ATM_Sessions 402; Alert_Condition_Time 404; and Alert_Condition_Entry_Percentage 406.

Referring further to FIG. 4, the Door_Popper_Monitoring_Enable setting 400 may enable or disable the door popper monitoring function. When enabled, the door popper monitoring function is enabled when the ATM vestibule door is also enabled. The Alert_Condition_ATM_Sessions setting 402 may determine a minimum number of ATM sessions before an alert may be sent in order to assure a reasonable sample size before determining whether an alarm should be sent.

Referring again to FIG. 4, the Alert_Condition_Time setting 404 may determine a minimum time that alarm monitoring is enabled before an alert may be sent to allow, for example, a reasonable sample size before determining whether the alert should be sent. The Alert_Condition_Entry_Percentage setting 406 may determine, for example, a percentage value (i.e., a ratio of a number of ATM vestibule door entries to a number of ATM sessions) below which an alert and/or error code may be sent if minimum ATM sessions and time requirements are met.

In embodiments of the invention, initial default settings may be coded into application software running, for example, on the processor of the door popper activity monitor software. Examples of default settings for configurable parameters for embodiments of the invention are also shown in FIG. 4. Referring again to FIG. 4, a default setting for Door_Popper_Monitoring_Enable 400 may be "on"; a default setting for Alert_Condition_ATM_Sessions 402 may be "ten"; a default setting for Alert_Condition_Time 404 may be "one hour"; and a default setting for Alert_Condition_Entry_Percentage 406 may be "fifty percent".

FIGS. 5A, 5B, 5C, and 5D show examples of error codes that may be displayed on the door popper status display for embodiments of the invention. Such error codes may include, for example, "Door Popper—Security Alert: Vestibule Door is Disabled" 500 as shown in FIG. 5A; "Door Popper—Security Alert: Vestibule Door is Enabled" 502 as shown in FIG. 5B"; "Door Popper—Security Alert: Door Popper Activity—OK" 504 as shown in FIG. 5C; and/or "Door Popper—Security Alert: Door Popper Activity—NOT OK" 506 as shown in FIG. 5D.

Figure 6:
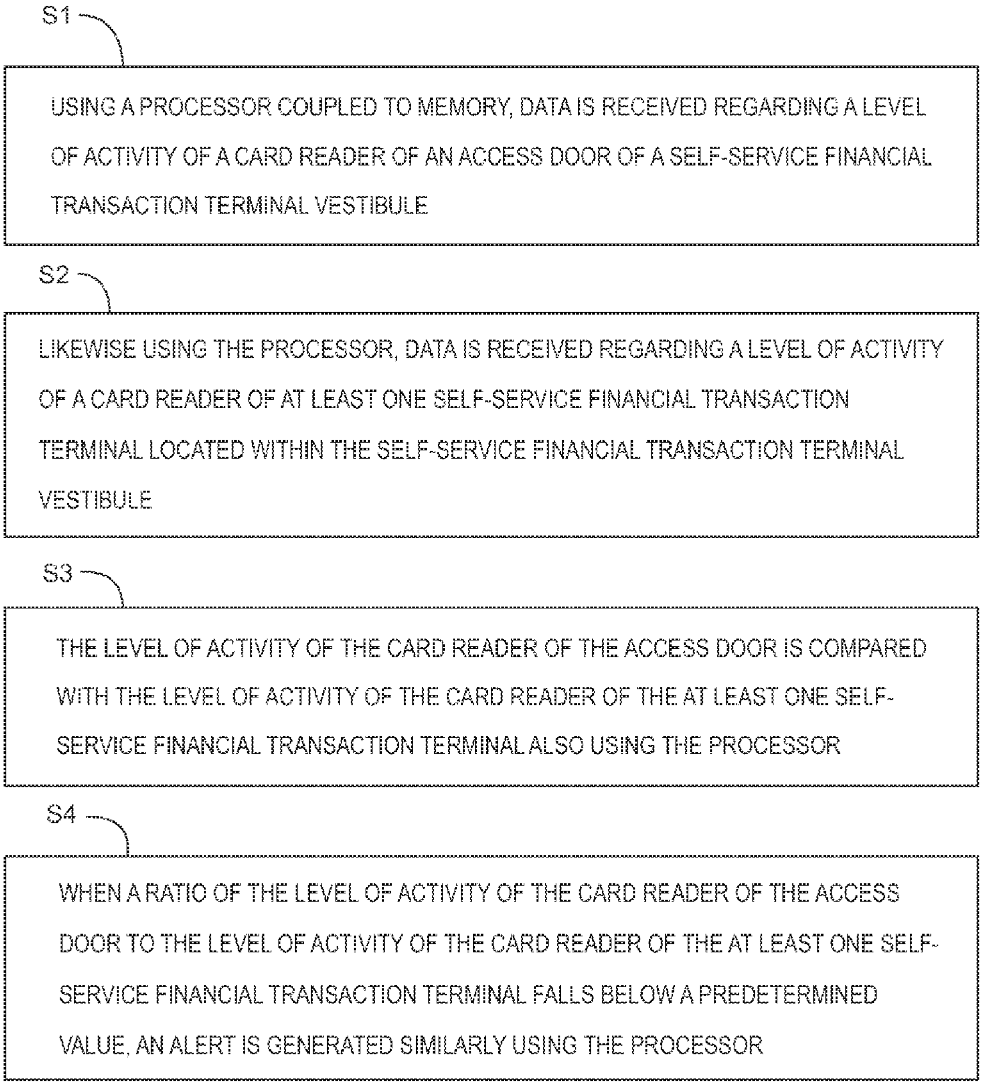
FIG. 6 is a flow chart that illustrates an example of the process of monitoring card reader activity for embodiments of the invention.

FIG. 6 is a flow chart that illustrates an example of the process of monitoring card reader activity for embodiments of the invention. Referring to FIG. 6, at 51, using a processor coupled to memory, data is received regarding a level of activity of a card reader of an access door of a self-service financial transaction terminal vestibule. At S2, likewise using the processor, data is received regarding a level of activity of a card reader of at least one self-service financial transaction terminal located within the self-service financial transaction terminal vestibule. At S3, the level of activity of the card reader of the access door is compared with the level of activity of the card reader of the at least one self-service financial transaction terminal also using the processor. At S4, when a ratio of the level of activity of the card reader of the access door to the level of activity of the card reader of the at least one self-service financial transaction terminal falls below a predetermined value, an alert is generated, similarly using the processor.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method of monitoring card reader activity, comprising:

receiving, using a processor coupled to memory, data regarding a level of activity of a card reader of an access door of a self-service financial transaction terminal vestibule;

receiving, using the processor, data regarding a level of activity of a card reader of at least one self-service financial transaction terminal located within the self-service financial transaction terminal vestibule;

comparing, using the processor, the level of activity of the card reader of the access door with the level of activity of the card reader of the at least one self-service financial transaction terminal; and generating, using the processor, an alert when a ratio of the level of activity of the card reader of the access door to the level of activity of the card reader of the at least one self-service financial transaction terminal falls below a predetermined value.

2. The method of claim 1, wherein receiving the data regarding the level of activity of the card reader of the access door further comprises receiving the data regarding the level of activity of the card reader of the access door by a processor of a door popper activity monitor.

3. The method of claim 2, wherein receiving the data regarding the level of activity of the card reader of the access door further comprises receiving the data regarding the level of activity of the card reader of the access door by the processor of the door popper activity monitor from a processor of a door popper server.

4. The method of claim 3, wherein receiving the data regarding the level of activity of the card reader of the access door further comprises receiving a notification message by the processor of the door popper activity monitor from the processor of the door popper server each time the processor of the door popper server sends an open door reply message to a processor of a door popper controller coupled to the card reader of the access door.

5. The method of claim 1, wherein receiving the data regarding the level of activity of the card reader of the at least one self-service financial transaction terminal further comprises receiving the data regarding the level of activity of the card reader of the at least one self-service financial transaction terminal by a processor of a door popper activity monitor.

6. The method of claim 5, wherein receiving the data regarding the level of activity of the card reader of the at least one self-service financial transaction terminal further comprises receiving the data regarding the level of activity of the card reader of the at least one self-service financial transaction terminal by the processor of the door popper activity monitor from a self-service financial transaction terminal server.

7. The method of claim 6, wherein receiving the data regarding the level of activity of the card reader of the at least one self-service financial transaction terminal further comprises receiving a notification message by the processor of the door popper activity monitor from the processor of the self-service financial transaction terminal server each time the processor of the self-service financial transaction terminal server sends an authorization reply message to a processor of the at least one self-service financial transaction terminal.

8. The method of claim 1, wherein comparing the level of activity of the card reader of the access door with the level of activity of the card reader of the at least one self-service financial transaction terminal further comprises comparing the level of activity of the card reader of the access door with the level of activity of the card reader of the at least one self-service financial transaction terminal by a processor of a door popper activity monitor.

9. The method of claim 1, wherein comparing the level of activity of the card reader of the access door with the level of activity of the card reader of the at least one self-service financial transaction terminal further comprises calculating the ratio of the level of activity of the card reader of the access door to the level of activity of the card reader of the at least one self-service financial transaction terminal.

10. The method of claim 9, wherein calculating the ratio further comprises calculating the ratio of the level of activity of the card reader of the access door to the level of activity of the card reader of the at least one self-service financial transaction terminal based on data regarding the predetermined level of activity of the card reader of the access door and data regarding the predetermined level of activity of the card reader of the at least one self-service financial transaction terminal received during a predetermined period of time.

11. The method of claim 10, wherein calculating the ratio further comprises calculating the ratio of the level of activity of the card reader of the access door to the level of activity of the card reader of the at least one self-service financial transaction terminal based on data regarding the predetermined level of activity of the card reader of the access door and data regarding the predetermined level of activity of the card reader of the at least one self-service financial transaction terminal received during a predetermined period of time when a locking mechanism of the access door is enabled.

12. The method of claim 1, wherein generating the alert further comprises generating the alert by a processor of a door popper activity monitor.

13. The method of claim 1, wherein generating the alert further comprises remotely disabling the at least one self-service financial transaction terminal when the ratio of the level of activity of the card reader of the access door to the level of activity of the card reader of the at least one self-service financial transaction terminal falls below the predetermined value.

14. The method of claim 1, wherein generating the alert further comprises generating the alert when the ratio of the level of activity of the card reader of the access door to the level of activity of the card reader of the at least one self-service financial transaction terminal falls below a predetermined adjustable value.

15. The method of claim 14, wherein generating the alert further comprises adjusting the predetermined adjustable value when a predetermined level of false alerts are generated.

16. The method of claim 15, wherein adjusting the predetermined adjustable value further comprises decreasing the predetermined adjustable value when the predetermined level of false alerts are generated.

17. A machine for monitoring card reader activity, comprising:

a processor coupled to memory, said processor being programmed for:

receiving data regarding a level of activity of a card reader of an access door of a self-service financial transaction terminal vestibule;

receiving data regarding a level of activity of a card reader of at least one self-service financial transaction terminal located within the self-service financial transaction terminal vestibule;

comparing the level of activity of the card reader of the access door with the level of activity of the card reader of the at least one self-service financial transaction terminal; and generating an alert when a ratio of the level of activity of the card reader of the access door to the level of activity of the card reader of the at least one self-service financial transaction terminal falls below a predetermined value.

* * * * *